United States Patent Office 3,803,294
Patented Apr. 9, 1974

3,803,294
PROCESS FOR THE PRODUCTION OF SODIUM CYANATE
Tomio Okada, Sagamihara, and Norio Asai, Chiba, Japan, assignors to Sagami Chemical Research Center, Tokyo, Japan
No Drawing. Filed May 16, 1972, Ser. No. 253,739
Int. Cl. C01c 3/10, 3/14
U.S. Cl. 423—365                              6 Claims

ABSTRACT OF THE DISCLOSURE

An improved process for the production of sodium cyanate from cyanogen and concentrated aqueous sodium hydroxide is disclosed. This improved process is carried out using an aqueous sodium hydroxide having a concentration of more than 15% by weight in a continuous or batch manner.

BACKGROUND OF THE INVENTION

1. Field of the invention

This invention relates to a process for the preparation of sodium cyanate of high purity and in high yield by reacting cyanogen with concentrated aqueous sodium hydroxide (caustic soda) and isolating the resulting sodium cyanate by taking advantage of the distinctly different solubilities of the thus formed sodium cyanide (NaCN) and sodium cyanate (NaOCN) in said aqueous solution.

As is well known to those skilled in the art, sodium cyanate exhibits a herbicidal activity which acts with extreme rapidity, resulting in the death of weeds three to four days after application, and has a residual activity which is inactivated within a short period of time. Thus, sodium cyanate possesses a wide variety of applications as a herbicide and has been used for killing various annual weeds in the crop and paddy fields. Also, sodium cyanate has advantages in that its excellent herbicidal activity is enhanced because it sticks well to the weeds and exhibits an effect as a nitrogenous fertilizer because it is completely degraded into carbonate and ammonia within several days after application. In addition, sodium cyanate has been used as a case hardening agent for steel and as a raw material for organic synthesis, and the like.

2. Description of the prior art

At present, the process for the production of sodium cyanate in industry comprises the calcination of sodium carbamate with a by-product, sodium carbonate, produced in an equimolar amount as indicated below:

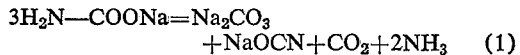

or it comprises the reaction of urea and sodium carbonate resulting in sodium cyanate and ammonium carbonate as a by-product, as indicated below:

$$2CO(NH_2)_2 + Na_2CO_3 = 2NaOCN + NH_4CO_3 \quad (2)$$

Other known processes for the production of sodium cyanate comprise the oxidation of sodium cyanide with an oxidizing agent such as lead oxide and the electrolytic oxidation of sodium cyanide using platinum, lead or lead oxide as an anode. However, these processes have not yet been practically employed in the production of sodium cyanate on a commercial scale.

In the above described urea method (2) using urea and sodium carbonate as raw materials, one mole of ammonium carbonate is produced per two moles of the desired sodium cyanate. Various procedures for separating ammonium carbonate from sodium cyanate have been proposed, and the most commonly employed procedure for obtaining sodium cyanate having high purity comprises extracting a crude sodium cyanate with ammonium nitrate and washing the resulting extract with methanol and liquid ammonia. However, this separation procedure requires multiple steps and is not advantageous in industrial production of sodium cyanate.

On the other hand, the separation of sodium carbonate produced as a byproduct in the sodium carbamate process (1) is troublesome. This separation is conducted by using 80% aqueous methanol or liquid amonia, but, in either case, the separation must be carried out several times in order to ensure sodium cyanate of high purity and, therefore, is not practical in the industrial production of sodium cyanate.

For the reasons as set forth above, the purity of sodium cyanate presently available is as low as 80% to 85%. Although the effect brought about by the impurities such as sodium carbonate, ammonium carbonate and the like contained in sodium cyanate is not serious, it is apparent that the amount of such impurities is not negligible and such high proportion of impurities is not desirable since it makes the transportation of sodium cyanate as a herbicide inefficient. Also, when sodium cyanate having a high purity is required as in case of a chemical reagent, it is the usual practice that the commercially available sodium cyanate must first be subjected to purification procedure using methanol or other solvents.

DESCRIPTION OF THE INVENTION

The process of this invention is radically different from the above described conventional procedures which are troublesome in the separation and purification procedures. That is, the present invention is based on the findings that sodium cyanate having a purity of more than 99% can be produced in a yield of more than 97% by bubbling cyanogen into a concentrated aqueous sodium hydroxide to produce sodium cyanide and sodium cyanate simultaneously according to the following equation:

In the above reaction, the two salts produced can be separated easily and effectively from one another by a simple operation since only sodium cyanate is readily precipitated during the course of reaction and the sodium cyanide produced is only in an equimolar amount and remains dissolved in the aqueous sodium hydroxide solution. Thus, the process of this invention has the following advantages over the conventional processes for the production of sodium cyanate:

(1) No energy is required for heating or cooling the reaction system since the reaction according to the present invention is easily carried out at or near the normal temperature.

(2) No specific solvents are required for the isolation of the desired sodium cyanate.

(3) The production system or apparatus can be simplified for the reasons as set forth in (1) and (2) above.

(4) High purity and yield of the desired sodium cyanate product are obtainable.

(5) The byproduct, sodium cyanide, is a valuable chemical product.

Sodium cyanide as a byproduct as set forth in (5) above has various utilities such as for the "cyanide process" of gold and the quench-hardening of metals as well as being useful as a photographic agent, reducing agent, in pharmaceuticals and the like. Sodium cyanide was produced, in the past, by the "Castner method" in which carbon, sodium metal and ammonia as raw materials are reacted at a temperature above 550° C., but it is presently produced by bubbling hydrogen cyanide directly into an aqueous solution of sodium hydroxide. The principle of the process of this invention can be thought to include the production of sodium cyanide similar to the above process for producing sodium cyanide.

The raw material cyanogen used in the present invention is not produced on an industrial scale, but a method which is capable of producing cyanogen from hydrogen cyanide at low cost and in large amounts has been established as disclosed in U.S. Pat. 3,494,734 and no technical difficulties seem to be present in supply of cyanogen as an industrial raw material.

The present inventors investigated the conventional process for the production of sodium cyanate from cyanogen and an aqueous sodium hydroxide solution and unexpectedly found that sodium cyanide as a by-product and the desired sodium cyanate exhibit significantly different solubilities in an aqueous sodium hydroxide solution having a specific concentration, as illustrated in the following reference example. On the basis of the above finding, the present inventors found that this difference in the solubility makes it possible to precipitate only the desired sodium cyanate from the reaction system and the precipitated sodium cyanate can then be isolated by a simple procedure such as filtration of the reaction mixture, thereby obtaining sodium cyanate of high purity.

REFERENCE EXAMPLE

The solubilities of sodium cyanide and sodium cyanate in aqueous solutions of sodium hydroxide having various concentrations were determined at normal temperature (22° C.) and the results are shown in the following table.

TABLE 1

| Concentration of Sodium hydroxide (percent by weight) | Solubilities (g./100 ml. soln.) NaCN | Solubilities (g./100 ml. soln.) NaOCN | Ratio of solubility (NaCN/NaOCN) |
| --- | --- | --- | --- |
| 45.1 | 17.2 | 0.19 | 90.0 |
| 33.4 | 27.2 | 0.34 | 80.2 |
| 28.6 | 29.7 | 0.63 | 47.2 |
| 23.2 | 35.4 | 1.58 | 22.4 |
| 16.8 | 41.4 | 2.92 | 13.8 |

From the above results, it will be understood that one of the features of the present invention can be realized by the use of a concentrated aqueous sodium hydroxide solution. Thus, at lower concentrations of sodium hydroxide, the ratio of solubility of sodium cyanide and sodium cyanate decreases so that the separation of these salts from one another becomes inefficient and, at the same time, the cyanogen which was bubbled is brought into contact with the solution having a lower concentration of sodium hydroxide thereby yielding a brown-colored substance and lowering the purity and yield of the desired product. However, in the batch type reaction, it was found experimentally that, when an aqueous sodium hydroxide solution having a concentration more than 38% by weight is used and all the sodium hydroxide is reacted with cyanogen, the purity of the product is lowered due to the fact that the byproduct sodium cyanide is precipitated since it is produced in an amount exceeding its maximum solubility in the reaction system and is contained in the isolated sodium cyanate. Accordingly, in case an aqueous sodium hydroxide solution having more than 38% concentration is used, it is necessary to terminate the bubbling of cyanogen just before the precipitation of sodium cyanide in order to ensure sodium cyanate of high purity.

The concentration of sodium hydroxide in an aqueous sodium hydroxide solution may vary from 15% by weight to its maximum solubility at a given temperature, but the preferred concentration is in the range of from 35% by weight to 40% by weight. The optimum concentration of sodium hydroxide has been found to be 37.2% by weight.

It was also found experimentally that the solubility of sodium cyanate remains relatively constant during the course of the reaction because, as the reaction proceeds, the concentration of sodium hydroxide in the reaction system decreases but, in contrast, the concentration of sodium cyanide byproduct increases.

In carrying out the process of this invention in a continuous manner, cyanogen is continuously bubbled into an aqueous solution of sodium hydroxide charged in a blowing tank while maintaining an appropriate concentration of sodium hydroxide, and the precipitated sodium cyanate is continuously separated from the reaction system. The mother liquor of the reaction from which the precipitated sodium cyanate has been separated is recycled to the blowing tank so as to carry out the above operations repeatedly. The sodium cyanide accumulated in a dissolved state in the mother liquor of the reaction during the recycling can easily be precipitated and separated from the reaction system. The precipitation and separation of sodium cyanide can conveniently be accomplished by cooling the recycled mother liquor, prior to introducing into the blowing tank, to a temperature at which the precipitation of sodium cyanide occurs without causing coprecipitation of sodium hydroxide which is remained in the mother liquor. The temperature suitable to the precipitation of sodium cyanide may vary with the concentration of sodium cyanide and sodium hydroxide in the mother liquor, but it can easily be determined on a small scale experiment.

The reaction of this invention is preferably carried out at a temperature below 50° C. in order to avoid hydrolysis of the sodium cyanate which is formed in the reaction. On the other hand, the use of an excessively low reaction temperature is not advantageous from the viewpoint of the efficiency of the reaction because the lower temperature reduces the saturation concentration of sodium hydroxide. The reaction temperature which may be used is in the range of from 0° to 50° C., but in industrial production a temperature at which industrial water can be used as a coolant for removing the reaction heat is advantageous.

As described in the examples in detail, sodium cyanate produced in accordance with the process of this invention has a purity as high as 99% or more. The product may further be purified by washing with methanol to remove a small amount of sodium cyanide thereby yielding a product which is substantially free from impurities.

The present invention is further illustrated by the following examples, but they are not to be construed as limiting the scope of the invention.

EXAMPLE 1

100 ml. of an aqueous solution of sodium hydroxide having a concentration of 17.5% by weight was charged in a breaker, and the temperature of the solution was maintained at 16±1° C. while stirring with a stirring rod. Under this condition, 5.5 g. of cyanogen was bubbled into the solution through a glass tube having an orifice 0.5 mm. in diameter. The aqueous sodium hydroxide solution turned into a milky color due to the precipitation of sodium cyanate, and 4.3 g. (62.8% yield) of sodium cyanate was isolated from the reaction mixture by filtration. The purity determination according to the titration method using silver nitrate and potassium chromate as an indicator showed that the resulting product is 98.5% sodium cyanate. In this product, the proportion of sodium cyanide contaminant was found to be 0.2%, the balance of impurities being sodium hydroxide which was passed through the filter and sodium carbonate which was formed by contact of the reaction solution with air during the course of the reaction.

EXAMPLE 2

Under the same conditions as those described in Example 1, but using an aqueous sodium hydroxide solution having a concentration of 37.2% by weight and 24.8 g. of cyanogen (an amount slightly in excess of the theoretical amount), there was obtained sodium cyanate having 99.6% purity in 97.8% yield with only 0.3% sodium cyanide contaminant.

EXAMPLE 3

Under the same conditions as those described in Examples 1 and 2, but using an increased concentration of sodium hydroxide (42.5% by weight) and 28.7 g. of cyanogen (an amount slightly in excess of the theoretical amount), there was obtained sodium cyanate having 83.3% purity in 78.0% yield with 15.1% sodium cyanide contaminant.

A comparable result was obtained when the concentration of sodium hydroxide was increased to its maximum solubility (for example, 52.2% by weight at 20° C.).

EXAMPLE 4

Under the same conditions as those described in Example 2, but using a reaction temperature of 50±1° C., there was obtained sodium cyanate having 96.2% purity in 81.5% yield with 0.8% sodium cyanide contaminant and 2.8% sodium carbonate which was formed by hydrolysis of sodium cyanate.

What is claimed is:

1. A process for the production of sodium cyanate which comprises reacting cyanogen with an aqueous sodium hydroxide solution having a sodium hydroxide concentration in excess of 15%, at a temperature of 0° C. to 50° C. to produce sodium cyanate precipitate, removing said sodium cyanate precipitate from the reaction medium and continuing said reacting and removing steps until sodium cyanide begins to precipitate.

2. The process according to claim 1, wherein said concentration of sodium hydroxide is in the range of from 35% to 40% by weight.

3. The process according to claim 1, wherein said concentration of sodium hydroxide is 37.2% by weight.

4. The process according to claim 1, wherein said temperature is room temperature.

5. The process according to claim 1, wherein said reaction between cyanogen and an aqueous sodium hydroxide solution is conducted in a continuous manner by continuously bubbling cyanogen into an aqueous sodium hydroxide solution while maintaining a concentration of sodium hydroxide at more than 15% by weight, continuously separating the preciptated sodium cyanate from the reaction system and recycling the mother liquor from which the precipitated sodium cyanate has been separated to the bubbling step.

6. The process according to claim 1, wherein said reaction between cyanogen and an aqueous sodium hydroxide solution is conducted in a batch manner using an aqueous sodium hydroxide solution having an initial concentration of more than 15% by weight.

References Cited

Senter: "A Text of Book of Inorganic Chemistry," fifth edition, p. 344, D. Van Nostrand Company, New York, 1930.

OSCAR R. VERTIZ, Primary Examiner

H. S. MILLER, Assistant Examiner

U.S. Cl. X.R.

423—371